United States Patent
Conway et al.

(10) Patent No.: US 9,442,587 B2
(45) Date of Patent: Sep. 13, 2016

(54) TOUCH SENSOR CONTROLLER RESPONSIVE TO ENVIRONMENTAL OPERATING CONDITIONS

(71) Applicant: L3 Communications Corporation, New York, NY (US)

(72) Inventors: Jerome Conway, Johns Creek, GA (US); Marcus Dutton, Canton, GA (US)

(73) Assignee: L-3 COMMUNICATIONS CORPORATION, New York, NY (US)

(*) Notice: Subject to any disclaimer, the term of this patent is extended or adjusted under 35 U.S.C. 154(b) by 7 days.

(21) Appl. No.: 14/096,761

(22) Filed: Dec. 4, 2013

(65) Prior Publication Data

US 2014/0160048 A1  Jun. 12, 2014

Related U.S. Application Data

(60) Provisional application No. 61/733,102, filed on Dec. 4, 2012.

(51) Int. Cl.
| | |
|---|---|
| *G06F 3/041* | (2006.01) |
| *B60K 35/00* | (2006.01) |
| *G06F 3/0488* | (2013.01) |

(52) U.S. Cl.
CPC ............. *G06F 3/041* (2013.01); *B60K 35/00* (2013.01); *G06F 3/0418* (2013.01); *G06F 3/0488* (2013.01); *B60K 2350/1024* (2013.01); *B60K 2350/1052* (2013.01)

(58) Field of Classification Search
None
See application file for complete search history.

(56) References Cited

U.S. PATENT DOCUMENTS

| | | | |
|---|---|---|---|
| 5,973,676 A | 10/1999 | Kawakura | |
| 8,102,381 B2* | 1/2012 | Kimura | G01C 21/3664 345/156 |
| 2003/0220725 A1 | 11/2003 | Harter, Jr. | |
| 2007/0040813 A1 | 2/2007 | Kushler | |
| 2008/0052627 A1 | 2/2008 | Oguchi | |
| 2009/0051648 A1 | 2/2009 | Shamaie et al. | |

(Continued)

FOREIGN PATENT DOCUMENTS

| | | |
|---|---|---|
| EP | 1702805 A1 | 9/2006 |
| EP | 2258587 A1 | 12/2010 |

(Continued)

OTHER PUBLICATIONS

ISA/European Patent Office, The International Search and The Written Opinion of the International Searching Authority, 201-03-06, 11 pages.

*Primary Examiner* — Joseph Haley
*Assistant Examiner* — Ifedayo Iluyomade
(74) *Attorney, Agent, or Firm* — Gardner Groff Greenwald & Villanueva, P.C.

(57) ABSTRACT

A touch sensor controller system for use in a vehicle of the type utilizing a software application to be interfaced with by an operator of the vehicle includes a touch sensor and a touch detector associated with the touch sensor. A touch gesture processor is provided which prevents unwanted or unintended touch gestures from being communicated to the application software during certain operating conditions of the vehicle. The touch gesture processor receives inputs of the operating conditions of the vehicle and receives touch gesture information from the touch detector, and the touch gesture processor is operative to determine the types of touch gestures to be permitted to be passed to the software application.

11 Claims, 3 Drawing Sheets

(56) References Cited

U.S. PATENT DOCUMENTS

| | | |
|---|---|---|
| 2009/0100383 A1 | 4/2009 | Sunday et al. |
| 2010/0277438 A1 | 11/2010 | Kawashima |
| 2010/0333044 A1 | 12/2010 | Kethireddy |
| 2012/0127115 A1* | 5/2012 | Gannon ............... G06F 3/0418 345/174 |
| 2012/0154294 A1 | 6/2012 | Hinckley |
| 2013/0100043 A1* | 4/2013 | Kolbe ................. G06F 3/0488 345/173 |
| 2013/0162582 A1* | 6/2013 | Hatano ................ B60K 37/06 345/173 |
| 2013/0198802 A1* | 8/2013 | Ricci ..................... H04L 63/10 726/1 |
| 2013/0234929 A1* | 9/2013 | Libin ....................... G06F 3/01 345/156 |

FOREIGN PATENT DOCUMENTS

| | | | |
|---|---|---|---|
| EP | 2455843 A2 | 5/2012 | |
| JP | WO2012029558 | * 3/2012 | ............ G06F 3/041 |
| WO | 2009026337 A1 | 2/2009 | |

* cited by examiner

TOUCH SENSOR CONTROLLER RESPONSIVE TO ENVIRONMENTAL OPERATING CONDITIONS

BACKGROUND

Currently, touch sensor-controller systems are designed to support a specific set of touch gestures. For example, a touch sensor-controller system may be designed for single touch gestures only, or one and two finger multi-touch gestures only, or for one, two, three, four, and five finger multi-touch gestures only, etc. Typically, known touch sensor-controller systems report all detected supported gestures to the software application, which in turn activates the specific action associated with the gesture within the computer being controlled by the touch sensor-controller system. This is done in a more or less wooden manner, regardless of whether environmental operating conditions would render the specific action inappropriate or whether the environmental operating conditions degrade the reliability of the touch gesture.

SUMMARY OF THE INVENTION

The present invention relates to a touch sensor-controller system to filter the gestures reported to the application software to a specific set of touch gestures based on an external input signal. For example, the touch sensor-controller can take into account the operating environmental conditions in deciding whether all gestures are to be allowed or whether only a subset of gestures is permitted. This has important applications where the operating conditions sometimes make certain types of touch gestures detected more likely to be accidental (and not intended). Thus, by limiting the types of touch gestures permitted under certain conditions, the reliability and/or safety of the operation of the application software can be improved, leading to improved performance and safety of the larger system or device in which the application software operates.

For example, application software which may be implemented in a motor vehicle, such as an automobile, can be more reliably operated at some times than at other times. Typically, when the vehicle is moving rapidly or is moving over uneven surfaces or is accelerating or braking, there is a greater chance that the operator of the application software might make an inadvertent touching of the touch sensor or might intend one touch gesture but accidentally make a different touch gesture due to the motion or vibration of the motor vehicle. Advantageously, the present invention can limit the permitted touch gestures that can be passed to the application software during those times when the reliability of the touch gestures is less than ideal.

Thus, in one preferred form the present invention comprises a touch sensor controller for use in a vehicle and utilizes operating conditions of the vehicle to determine the types of touch gestures to be permitted to be passed to a software application. The touch sensor controller includes a touch gesture processor which receives inputs of the operating conditions of the vehicle. The touch gesture processor also receives an input from a touch detector, which in turn is coupled to a touch sensor. In this way, the touch sensor controller is adapted to prevent unwanted or unintended touch gestures from being communicated to the application software during certain operating conditions of the vehicle. Such operating conditions that would typically trigger this filtering or limiting function of the touch sensor controller can include forward movement of the vehicle, rapid movement of the vehicle, heavy braking, heavy acceleration, hard lateral cornering, rough or bumpy movement, placing the vehicle into a mode in preparation for movement (e.g., placing the gear selector in drive), etc.

Described another way, the present invention comprises a touch sensor controller system for use in a vehicle of the type utilizing a software application to be interfaced with by an operator of the vehicle. The touch sensor controller system includes a touch sensor and a touch detector associated with the touch sensor. A touch gesture processor is provided which prevents unwanted or unintended touch gestures from being communicated to the application software during certain operating conditions of the vehicle. Preferably, the touch gesture processor receives inputs of the operating conditions of the vehicle and receives touch gesture information from the touch detector, and wherein the touch gesture processor is operative to determine the types of touch gestures to be permitted to be passed to the software application.

One type of vehicle in which this has good application is road vehicles or off-road vehicles (e.g., motor cars and trucks). This invention can also be implemented with trains, boats, airplanes, and military ground vehicles.

By utilizing this invention, designers of vehicles (aircraft, automobiles, etc.) and other systems utilizing touch sensor-controller systems to provide input to software applications can filter the allowable set of touch gestures based on signals provided external to the computer system being controlled by the touch sensor-controller system.

BRIEF DESCRIPTION OF THE DRAWING FIGURES

DETAILED DESCRIPTION OF THE EXAMPLE EMBODIMENTS

Figure 1:
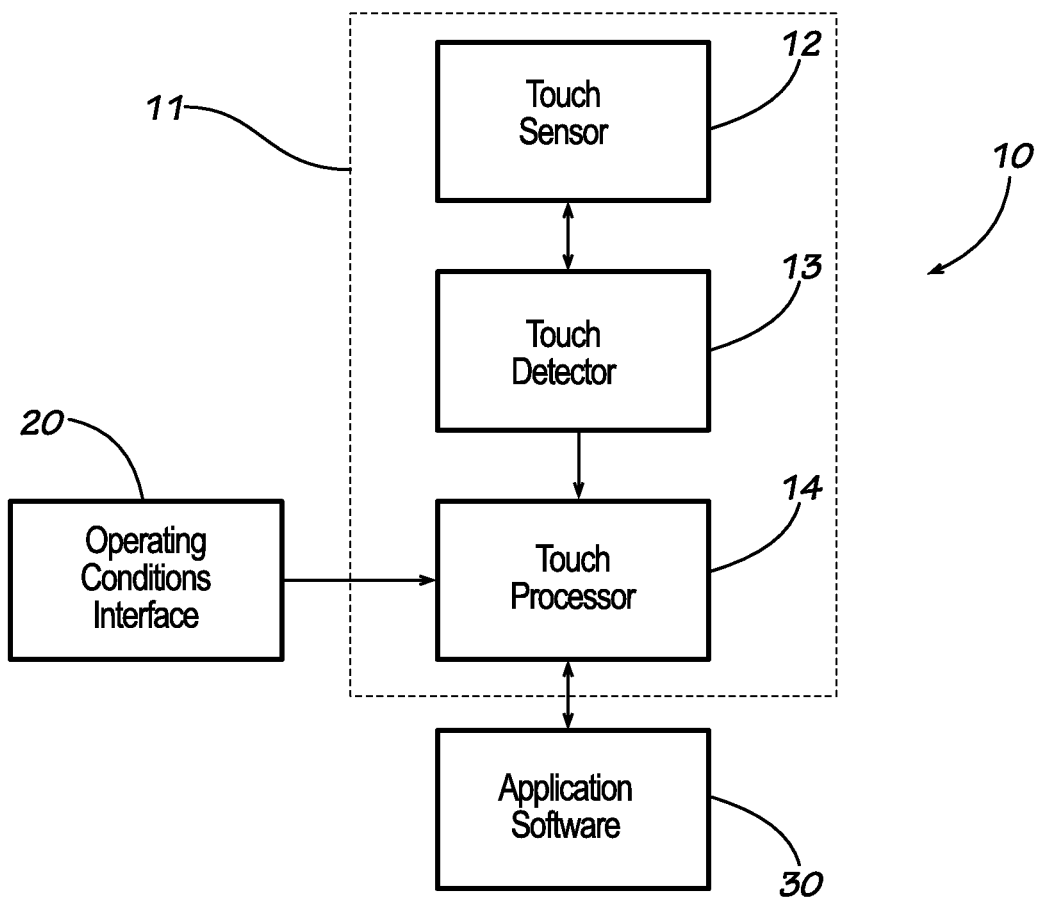
FIG. 1 is a schematic, functional diagram of a touch sensor-controller system according to a first preferred example form of the present invention.

The diagrams below show notional representations of the present invention. Referring now to FIG. 1, a touch sensor-controller system 10 is depicted according to a first preferred example form of the present invention. The touch sensor controller 10 can be used in a wide variety of environments and has excellent applicability in environments where there sometimes exists a heightened risk that the operator may inadvertently or accidentally touch the touch sensor in a manner to cause an unintended touch gesture. For example, such a touch sensor-controller system 10 can be used in a vehicle and can take into account operating conditions of the vehicle to determine the types of touch gestures to be permitted to be passed to a software application.

Preferably, the touch sensor controller system 10 includes a touch gesture controller 11 which receives inputs of the operating conditions of the vehicle. The touch gesture controller 11 includes a touch sensor 12, a touch detector 13, and a touch processor 14. The touch processor receives external inputs of the operating conditions then in existence from an operating conditions interface 20. The touch processor determines what touch gestures to pass to the application software 30, as will be described more below.

Preferably, the touch screen controller 11 is segregated into two main functions: touch detection (via the touch sensor 12 and the touch detector 13) and touch processing via touch processor 14. The touch detector 13 interfaces directly with the touch screen sensor 12 via a coupling and reports all touch activity to the touch processor 14 in screen coordinates.

The touch processor 14 processes the touch information provided by the touch detector, interprets the gesture type, formats the information according to the required software interface, and forwards the touch information to the software application at 30. Preferably, the touch processor 14 includes a gesture filter function which determines if the touch gesture information should be outputted to the software application 30 based on an external signal representing vehicular or environmental conditions as received from the operating conditions interface 20.

In this way, the touch sensor controller system 10 is adapted to prevent unwanted or unintended touch gestures from being communicated to the application software during certain operating conditions. For example, in vehicle environments, such operating conditions that would typically trigger this filtering or limiting function of the touch sensor controller system 10 can include forward movement of the vehicle, rapid movement of the vehicle, heavy braking, heavy acceleration, hard lateral cornering, rough or bumpy movement, placing the vehicle into a mode in preparation for movement (e.g., placing the gear selector in drive), etc. One type of vehicle in which this has good application is road vehicles or off-road vehicles (e.g., motor cars and trucks). This invention can also be implemented with trains, boats, airplanes, and military ground vehicles.

Figure 2:
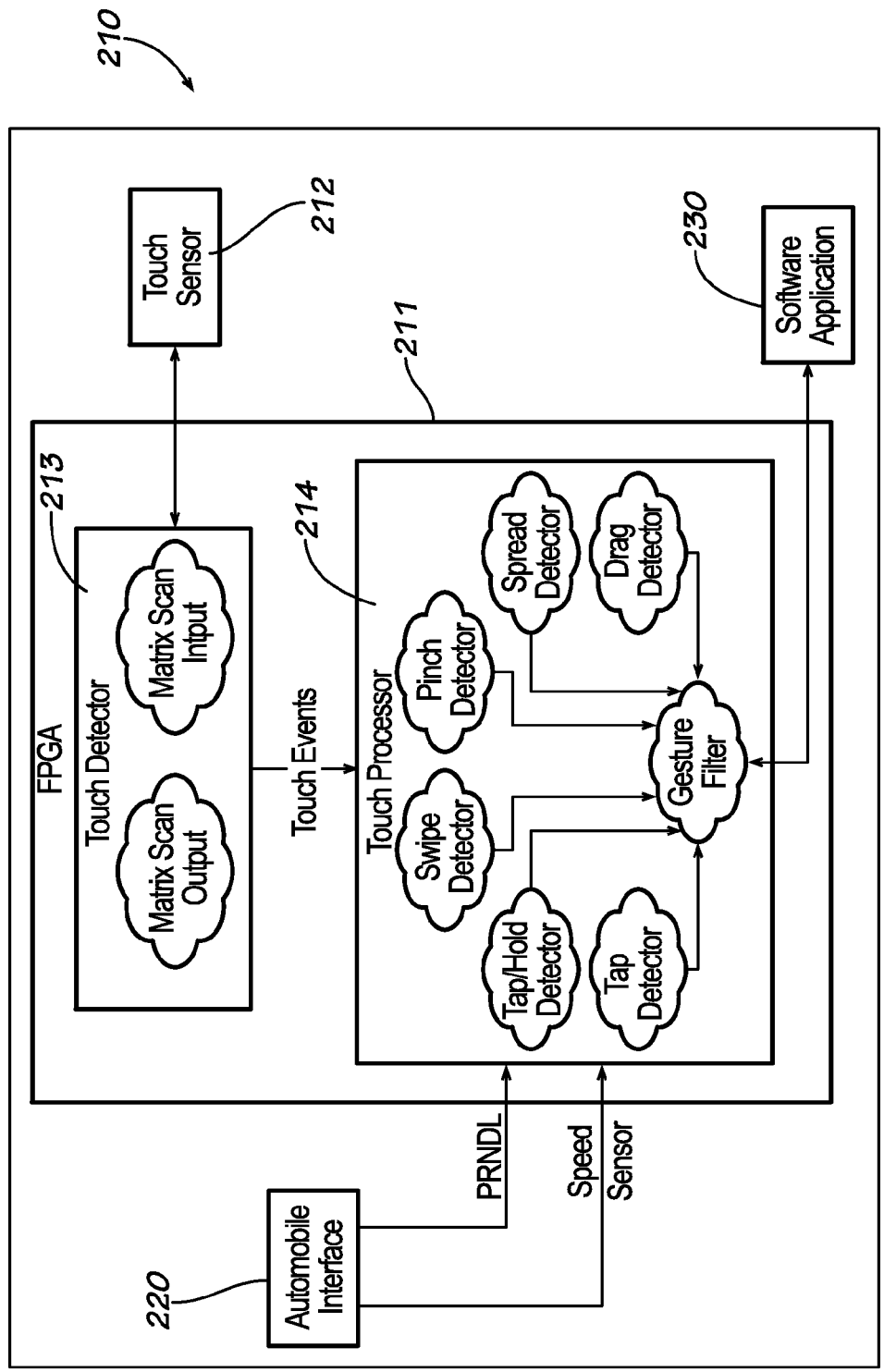
FIG. 2 is a schematic, functional diagram of a touch sensor-controller system according to a second preferred example form of the present invention.

Referring now to FIG. 2, an example automobile implementation is shown. The touch sensor controller system 210 includes a touch gesture controller 211 which receives inputs of the operating conditions of the automobile. The touch gesture controller 211 includes a touch sensor 212, a touch detector 213, and a touch processor 214. The touch processor receives external inputs of the operating conditions then in existence from an operating conditions interface 220. The touch processor 214 determines what touch gestures to pass to the application software 230.

Again, preferably, the touch screen controller 211 is segregated into two main functions: touch detection (via the touch sensor 212 and the touch detector 213) and touch processing via touch processor 214. The touch detector 213 interfaces directly with the touch screen sensor 212 and reports all touch activity (labeled as touch events in this figure) to the touch processor 214 in screen coordinates.

The touch processor 214 processes the touch information provided by the touch detector, interprets the gesture type, formats the information according to the required software interface, and forwards the touch information to the software application 230. Preferably, the touch processor 214 includes a gesture filter function which determines if the touch gesture information should be outputted to the software application 230 based on information about vehicular or environmental conditions as received from the operating conditions interface 220. For example, when the "PRNDL" signal indicates that the automobile transmission is in the "Park" position, it may be desirable to allow all touch gestures possible in this implementation ("swipe", "pinch", "tap", "drag", etc.) to be output from the touch processor 214 to the application software GUI. Once the "PRNDL" signal indicates that the automobile is in gear, it may be desirable to restrict the touch gesture output to the "tap" and/or "tap and hold" gestures since the movement of the automobile may cause the user to unintentionally touch the touch sensor in multiple locations while interacting with the GUI, possibly causing ambiguous or unintentional inputs to the software application.

When the vehicle's "Speed Sensor" signal indicates that the automobile is moving at a speed above a set threshold, it may be desirable to restrict the touch gesture output to the "tap and hold" gesture since the vibration conditions in the automobile may cause the user to unintentionally tap the touch sensor while interacting with the GUI, possibly causing ambiguous or unintentional inputs to the software application. Other operating conditions of the vehicle can be used as inputs to trigger the filtering function of the touch processor 214.

Figure 3:
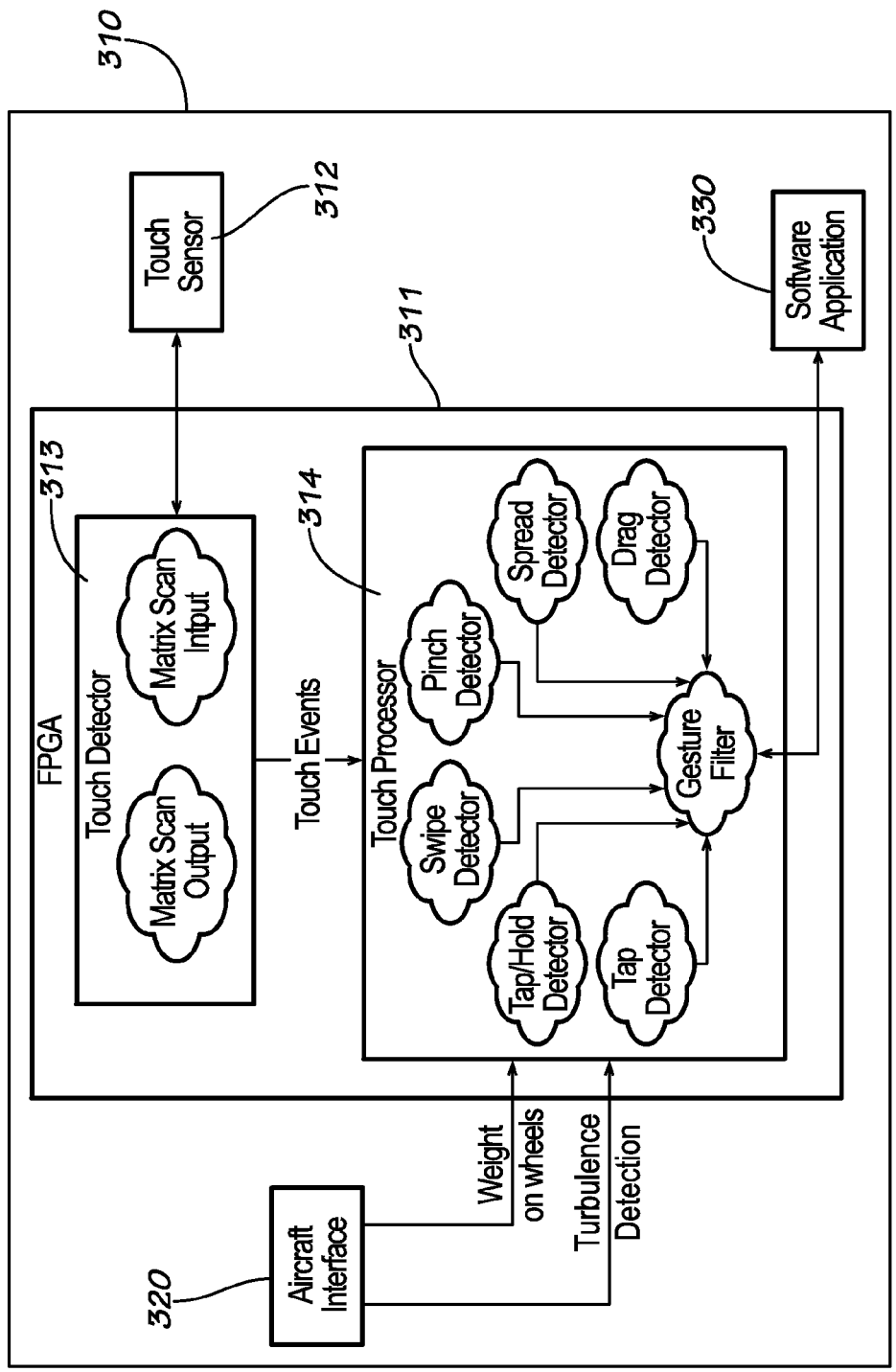
FIG. 3 is a schematic, functional diagram of a touch sensor-controller system according to a third preferred example form of the present invention.

Referring now to FIG. 3, an aircraft implementation is shown. The touch sensor controller system 310 includes a touch gesture controller 311 which receives inputs of the operating conditions of the aircraft. The touch gesture controller 311 includes a touch sensor 312, a touch detector 313, and a touch processor 314. The touch processor receives external inputs of the operating conditions then in existence from an operating conditions interface 320. The touch processor 314 determines what touch gestures to pass to the application software 330. The external signals are provided by the aircraft to the touch sensor-controller system.

When the "weight on wheels" signal indicates that the aircraft is on the ground, it may be desirable to allow all touch gestures possible in this implementation ("swipe", "pinch", "tap", "drag", etc.) to be outputted from the touch processor to the application software GUI. Once the "weight on wheels" signal indicates that the aircraft is in the air, it may be desirable to restrict the touch gesture output to the "tap and hold" gesture since the vibration conditions in the aircraft may cause to user to unintentionally touch the touch sensor in multiple locations while interacting with the GUI, possibly causing ambiguous or unintentional inputs to the software application.

Should the "turbulence detector" signal indicate the presence of turbulence above a set threshold, it may be desirable to restrict all touch gesture outputs since the turbulence conditions may cause the user to unintentionally interact with the touch sensor, possibly causing ambiguous or unintentional inputs to the software application.

It is to be understood that this invention is not limited to the specific devices, methods, conditions, or parameters described and/or shown herein, and that the terminology used herein is for the purpose of describing particular embodiments by way of example only. Indeed, these examples are not intended to be all-inclusive of the possible implementations of this invention. Additional platforms, such as hand-held devices and stationary kiosks may utilize this invention. Additional sensors, such as eye-tracking camera systems, proximity sensors, and navigation devices may be utilized to provide input situational awareness signals to the invention. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A touch sensor controller system for use in a vehicle of the type utilizing a software application to be interfaced with by an operator of the vehicle, the touch sensor controller system comprising:
   a touch sensor;
   a touch detector associated with the touch sensor; and
   a touch gesture processor which receives inputs of the operating conditions of the vehicle and which receives touch gesture information from the touch detector, wherein the touch gesture processor is operative to determine the types of touch gestures to be permitted to be passed to the software application, whereby the touch sensor controller system is adapted to prevent types of touch gestures which are unwanted or unintended during certain operating conditions of the vehicle from being communicated to the application software during those certain operating conditions, wherein the operating conditions include vehicular conditions and environmental conditions, and wherein when the operating conditions indicate movement of the vehicle, the types of touch gestures permitted to be passed to the software application are limited to tap and/or tap and hold gestures.

2. The touch sensor controller system as claimed in claim 1 wherein operating conditions that trigger filtering or limiting of the touch gestures forwarded to the application software include forward movement of the vehicle, rapid movement of the vehicle, braking, acceleration, lateral cornering, rough or bumpy movement, and placing the vehicle into a mode in preparation for movement.

3. The touch sensor controller system as claimed in claim 1 wherein the vehicle is an automobile.

4. The touch sensor controller system as claimed in claim 1 wherein the vehicle is an airplane.

5. The touch sensor controller system as claimed in claim 1 wherein the vehicle is a boat.

6. A touch sensor controller system for use in a vehicle of the type utilizing a software application to be interfaced with by an operator of the vehicle, the touch sensor controller system comprising:
   a touch sensor;
   a touch detector associated with the touch sensor; and
   a touch gesture processor which prevents certain types of touch gestures, which are unwanted or unintended, from being communicated to the application software during certain operating conditions of the vehicle, wherein the operating conditions include vehicular conditions and environmental conditions, and wherein when the operating conditions indicate movement of the vehicle, the touch gesture processor restricts the types of touch gestures that are passed to the application software to tap and/or tap and hold gestures.

7. The touch sensor controller system as claimed in claim 6 wherein the touch gesture processor receives inputs of the operating conditions of the vehicle and receives touch gesture information from the touch detector, and wherein the touch gesture processor is operative to determine the types of touch gestures to be permitted to be passed to the software application based on the operating conditions.

8. The touch controller system of claim 1, wherein when an operating condition of the vehicle exceeds a threshold, the touch gesture processor prevents all touch gestures from being communicated to the application software.

9. The touch controller system of claim 4, wherein when the operating conditions of the airplane indicate the presence of turbulence above a set threshold, the touch gesture processor prevents all touch gestures from being communicated to the application software.

10. The touch sensor controller system of claim 3, wherein the inputs of the operating conditions include signals which indicate when the automobile is parked, when the automobile is in gear, and when the automobile is moving.

11. The touch sensor controller system of claim 4, wherein the inputs of the operating conditions include signals which indicate when the airplane is on the ground and when conditions in which the airplane is in the air.

* * * * *